Sept. 27, 1932.  H. SAMMS  1,879,526

PLUG COCK

Filed May 6, 1931

Inventor

Horace Samms

By Mason Fenwick Lawrence
Attorneys

Patented Sept. 27, 1932

1,879,526

UNITED STATES PATENT OFFICE

HORACE SAMMS, OF HOLMESBURG, PENNSYLVANIA, ASSIGNOR TO AMERICAN MANGANESE BRONZE COMPANY, OF HOLMESBURG, PHILADELPHIA, PENNSYLVANIA

PLUG COCK

Application filed May 6, 1931. Serial No. 535,513.

The invention forming the subject matter of this application is an improvement on the plug cock disclosed in U. S. Patent #1,620,623, March 15, 1927.

Broadly this invention relates to plug cocks adapted for use as acid control valves, and is intended to be applied to the tapered plugs of such valves to raise the plug valve on its seat and thereby break the seal in order to facilitate the turning of the valve to open or closed positions. The present valve is intended to be raised from its seat as a preliminary to the rotation of the valve from either of its two positions, and to be locked in either of its said positions.

The main object of the invention is to provide a valve of this character which is of extreme simplicity and can be very cheaply manufactured and sold.

Other objects of the invention will become apparent as the detailed description thereof proceeds.

Figure 1:
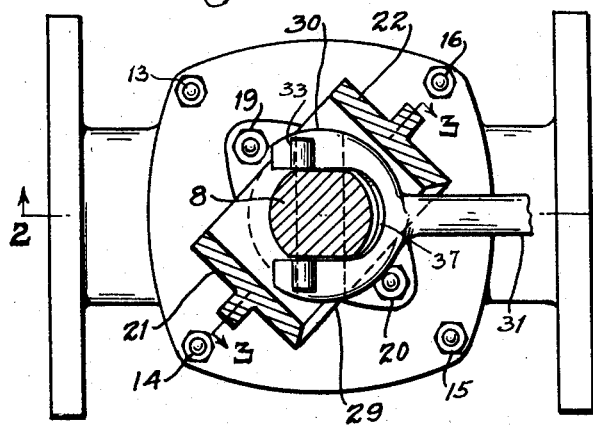
Figure 1 is a horizontal section of the valve plug taken on the line 1—1 of Figure 2.
Figure 3:
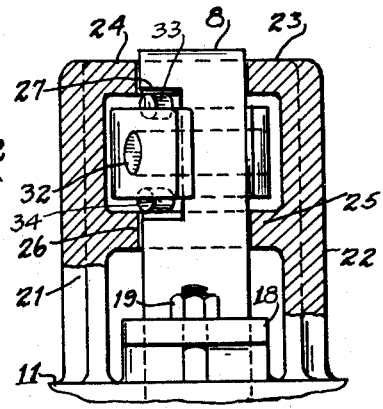
Figure 3 is a fragmentary vertical section taken on the line 3—3 of Figure 1.

As shown in the drawing, the tapered valve plug 1 is rotatably mounted in a correspondingly tapered valve seat 2 in the valve casing 3 which is provided at its opposite ends with flanges 4 and 5 adapted to be suitably secured to flanges of piping (not shown). The valve casing 3 is provided with the usual bore 6 adapted to register with the corresponding bore 7 formed in the valve plug 1. The valve plug 1 is provided with a valve stem 8 which extends slidably through an aperture 9 formed in a flange 10 depending from a yoke supporting plate 11 which is detachably secured to an upwardly extending annular flange 12 formed on the valve casing 3.

The yoke supporting plate 11 is shaped similarly to the annular flange 12 and is secured thereto by means of the bolts 13, 14, 15 and 16, shown in Figure 1 of the drawing. The yoke plate 11 is provided with a recess 17 in which is slidably mounted a bushing 18 detachably secured to said yoke plate by means of the bolts 19 and 20. This bushing 18 forms a bearing for the lower part of the valve stem 8.

Yoke standards 21 and 22 extend upwardly from the yoke supporting plate 11 and opposite sides of the valve stem 8. The upper ends of these standards are connected by a cross bar 23 provided with a central aperture 24 which forms a bearing for the upper end of the valve stem 8. A bridge 25 extends between the standards 21 and 22 a short distance below the bar 23; and this bridge is provided with a central aperture 26 which also forms a bearing for an intermediate part of the valve stem 8.

The lower face of the cross bar 23 and the upper face of the bridge 25 are machined parallel to each other to form surfaces adapted to receive roller bearings mounted on the handle to be described hereinafter. The valve stem 8 is provided at diametrically opposite sides with recesses 27 and 28 forming parallel plane faces adapted to form seats for the furcations 29 and 30 respectively of an operating handle 31.

The handle 31 is pivoted to the valve stem 8 by means of a pivot pin 32 which extends through registering apertures formed in the furcations 29 and 30 and in the valve stem 8.

It will be obvious from inspection of the drawing that the horizontal movement of the handle 31 is necessary to effect the turning of a valve plug 1 in either direction. It will also be obvious that the handle 31 is capable of a slight upward and downward movement about the axis of the pivot 32. The movement of the handle 31 about the axis of the pivot is utilized to raise and lower the valve plug 1 relative to its tapered seat at the beginning and end of an opening or closing movement.

To effect the vertical movements of the valve plug 1, the furcations 29 and 30 are each provided with rollers 33 and 34 projecting from their upper and lower edges respectively. Particular attention is directed to the fact that a straight line 35 joining the axes of the rollers 33 and 34, is offset with respect to the center or axis of the pivot 32, and that this line 35 is perpendicular to the parallel machined facing of the cross bar 23 and bridge 25 when the valve plug is slightly raised from its seat as shown in Figure 2.

Figure 2:
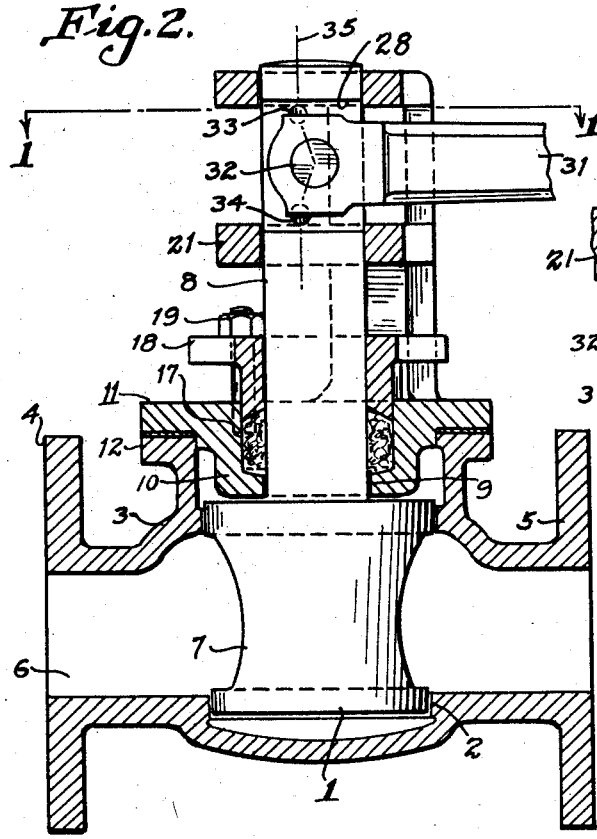
Figure 2 is a central vertical section taken on the line 2—2 of Figure 1.
Figure 4:
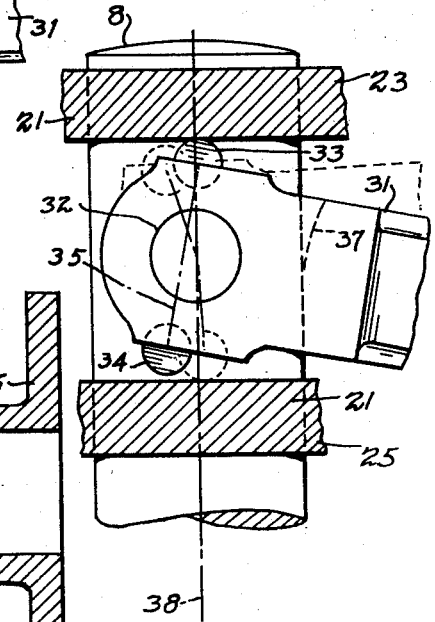
Figure 4 is a fragmentary vertical section of the upper part of the valve operating mechanism illustrated in Figure 2, but with the elements shown in a different operative position.

It will be apparent from inspection of Figure 2 that when the handle 31 is depressed, as shown in Figure 4, the upper roller 33 will remain in contact with the lower machined face of the cross bar 23, while the roller 34 will be raised out of contact with the machined face of the bridge 25. Obviously this movement into and out of contact of the rollers 33 and 34 is the result of offsetting their axes of rotation relative to the axis of the pivot 32.

The handle 31 is provided, at its junction with the furcations 29 and 30, with an arcuate end 37 which contacts with the rear side of the valve stem 8 and forms a stop for the handle 31 in the valve locking position or in a position in which the valve is fully lifted from its tapered seat. As shown in Figure 4, the valve stem 8 is fully depressed to hold the valve plug locked in either its opened or closed position, or in any other intermediate position. To effect this locking function, the rollers 33 and 34 are so arranged that when the handle is fully depressed the axis of the roller 33 is slightly toward the handle side of the axis 38 of the valve stem and valve plug. It will be obvious from Figure 4 of the drawing that the lower end of the curved part 37 is stopped against the valve stem 8 and that the pressure exerted between the roller 33 and the machined face of the cross bar 23 tends to hold this handle in the position shown.

It will also be apparent from Figure 4 of the drawing that when the handle 31 is raised so that the upper end of its curved part 37 contacts with the valve stem 8, this handle will be locked in such position as to hold the valve plug 1 raised from its seat, the roller 34 having its axis slightly toward the handle side of the axis 38 of the valve stem and valve plug. In this case the roller 34 will be in valve lifting contact with the machined face of the bridge 25, while the roller 33 will be in the position indicated by dotted line and out of contact with the lower face of cross bar 23.

From the foregoing disclosure it will be apparent that I have provided a very simple mechanism which can be utilized in connection with the handle of a valve plug for raising the plug from its seat as a preliminary to turning the plug relative to its seat. It will also be apparent that the handle may be manipulated so as to hold the plug in either raised or lowered position and at any desired angle of rotation relative to its seat.

While I have described a specific embodiment of my invention, it must be understood that the invention is not to be limited to that specific embodiment but may take any of the various forms falling within the scope of the claims appended hereto.

What I claim is:

1. A plug valve casing having a tapered seat therein, a tapered valve plug rotatably mounted in said seat and axially movable relative to said seat, a valve stem extending from said plug, a standard extending from said casing and having apertures formed therein to provide bearings for said stem, and a handle pivoted directly to said stem to swing about an axis perpendicular to the axis of said plug, said handle being provided with cam means engaging said standard for moving said plug axially relative to said seat and for locking it in any desired position of angular adjustment relative to said seat.

2. A plug valve casing having a tapered valve seat therein, a tapered valve plug rotatably mounted in said seat and axially movable relative to said seat, a stem extending axially from said plug, an inverted U-shaped standard extending from said valve casing on opposite sides of said stem, a bridge extending across the legs of said standard intermediate the ends thereof, the central part of said standard and said bridge being provided with bearing apertures for said stem, a handle pivoted to said stem between said part and bridge to swing about an axis perpendicular to the axis of the plug, and means on said handle engageable with said part and bridge for moving the plug axially toward and from its seat and for locking said plug in any desired position of angular adjustment relative to its seat.

3. A plug valve casing having a tapered valve seat therein, a tapered valve plug rotatably mounted in said seat and axially movable relative to said seat, a stem extending axially from said plug, an inverted U-shaped standard extending from said valve casing on opposite sides of said stem, a bridge extending across the legs of said standard intermediate the ends thereof, the central part of said standard and said bridge being provided with bearing apertures for said stem, a handle pivoted to said stem between said part and bridge to swing about an axis perpendicular to the axis of the plug, and means on said handle engageable with said part and bridge for moving the plug axially toward and from its seat at any desired position of angular rotation of the plug.

4. A plug valve casing having a tapered valve seat therein, a tapered valve plug rotatably mounted in said seat and axially movable relative to said seat, a stem extending axially from said plug, said stem being provided with recesses having plane faces parallel to each other and to the axis of said stem, a bifurcated handle having the furcations thereof seated in said recesses, a pivot pin passing through said furcations and stem perpendicular to the plane faces of said recesses to mount said handle to swing about an axis perpendicular to the axis, of said stem, an inverted U-shaped standard having the legs thereof secured to said casing and having its central part apertured to form a bearing for said stem, a bridge spaced from and extending parallel to said part, anti-friction members mounted in said furcations and adapted to contact with the adjacent faces of said part and bridge, the axis of rotation of said anti-friction members being displaced laterally relative to the axis of said plug.

In testimony whereof I hereby affix my signature.

HORACE SAMMS.